(12) United States Patent
Miesner

(10) Patent No.: US 12,464,291 B1
(45) Date of Patent: Nov. 4, 2025

(54) VOICE COIL ARRAY SPEAKER

(71) Applicant: The United States of America, as represented by the Secretary of the Navy, Arlington, VA (US)

(72) Inventor: John E. Miesner, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 155 days.

(21) Appl. No.: 18/437,486

(22) Filed: Feb. 9, 2024

(51) Int. Cl.
*H04R 9/06* (2006.01)
*H04R 9/02* (2006.01)

(52) U.S. Cl.
CPC .............. *H04R 9/06* (2013.01); *H04R 9/025* (2013.01)

(58) Field of Classification Search
CPC ...... H04R 9/06; H04R 9/025; H02K 41/0358; H02K 33/18; H02K 41/0354; H02K 41/0356
See application file for complete search history.

(56) References Cited

U.S. PATENT DOCUMENTS

| | | | |
|---|---|---|---|
| 7,386,144 B2 | 6/2008 | Vincent | |
| 8,582,799 B2 | 11/2013 | Tanabe | |
| 9,277,325 B2 | 3/2016 | Zhang | |
| 9,632,279 B2 | 4/2017 | Chen | |
| 9,894,442 B2 | 2/2018 | Salvatti | |
| 9,942,663 B1 | 4/2018 | Salvatti | |
| 10,063,128 B2 | 8/2018 | Wang | |
| 11,356,779 B2 | 6/2022 | Zhang | |
| 11,356,781 B2* | 6/2022 | Zhang | H04R 9/025 |
| 11,652,395 B1* | 5/2023 | Miesner | H02K 41/0356 |
| | | | 310/12.16 |
| 2006/0104472 A1 | 5/2006 | Abe | |
| 2019/0349690 A1* | 11/2019 | Chen | H04R 9/06 |

* cited by examiner

*Primary Examiner* — Angelica M McKinney
(74) *Attorney, Agent, or Firm* — Jesus J. Hernandez; U.S. Department of the Navy, Office of the General Counsel

(57) ABSTRACT

Example embodiments provide a voice coil array speaker comprising a speaker assembly, a coil assembly, and a magnet assembly. The speaker assembly may comprise a speaker frame, a stationary base plate, a diaphragm configured to be capable of axial movement, a heat conducting front plate connected to the diaphragm, and thermal bridges configured to conduct heat from the heat conducting front plate to the speaker frame. The coil assembly may be connected to the heat conducting front plate, the coil assembly may comprise an array of coils wound around coil formers. The magnet assembly may be attached to the stationary base plate, the magnet assembly may comprise an array of laterally and vertically polarized magnets in contact with flux concentrators. The array of coils may be connected such that the direction of current flow alternates between clockwise and counterclockwise moving laterally across the array.

10 Claims, 10 Drawing Sheets

VOICE COIL ARRAY SPEAKER

STATEMENT OF GOVERNMENT INTEREST

The following description was made in the performance of official duties by employees of the Department of the Navy. The claimed subject matter, encompassing various example embodiments, may be manufactured, used, licensed by or for the United States Government for governmental purposes without the payment of any royalties thereon. Potential licensees may contact the Technology Transfer Office, NAVSEA Naval Surface Warfare Center, Carderock Division, 9500 MacArthur Ave., West Bethesda, MD 20817, USA.

FIELD

The following description relates generally to voice coil speakers.

BACKGROUND

Permanent magnet voice coil speakers employ a diaphragm which is vibrated by a current conducting coil that resides in a magnetic flux from one or more permanent magnets. The interaction between the current passing through the voice coil and the magnetic field causes the voice coil to oscillate in accordance with the electrical current and drive the diaphragm to produce sound.

There are various voice coil design goals, such as minimizing the amount of a permanent magnet material, minimization of coil inductance, operation at a high efficiency, and providing effective cooling. The amount of permanent magnet material required may depend on the reluctance of the magnetic circuit. Coil inductance may depend upon many factors, including: the number of turns in the coil, the area enclosed, and the reluctance of a coil path. Operation at a high efficiency may be limited by the material of a coil former. Finally, active cooling methods have been developed, but are bulky and expensive.

SUMMARY

Example embodiments provide a voice coil array speaker comprising a speaker assembly, a coil assembly, and a magnet assembly. The speaker assembly may comprise a speaker frame, a stationary base plate, a diaphragm configured to be capable of axial movement, a heat conducting front plate connected to the diaphragm, and thermal bridges configured to conduct heat from the heat conducting front plate to the speaker frame. The coil assembly may be connected to the heat conducting front plate, the coil assembly may comprise an array of coils wound around coil formers. The magnet assembly may be attached to the stationary base plate, the magnet assembly may comprise an array of laterally and vertically polarized magnets in contact with flux concentrators. The array of coils may be connected such that the direction of current flow alternates between clockwise and counterclockwise moving laterally across the array.

BRIEF DESCRIPTION OF DRAWINGS

The accompanying figures are included to provide a further understanding of example embodiments, and are incorporated in and constitute part of this specification. In the figures.

DETAILED DESCRIPTION

Figure 1:
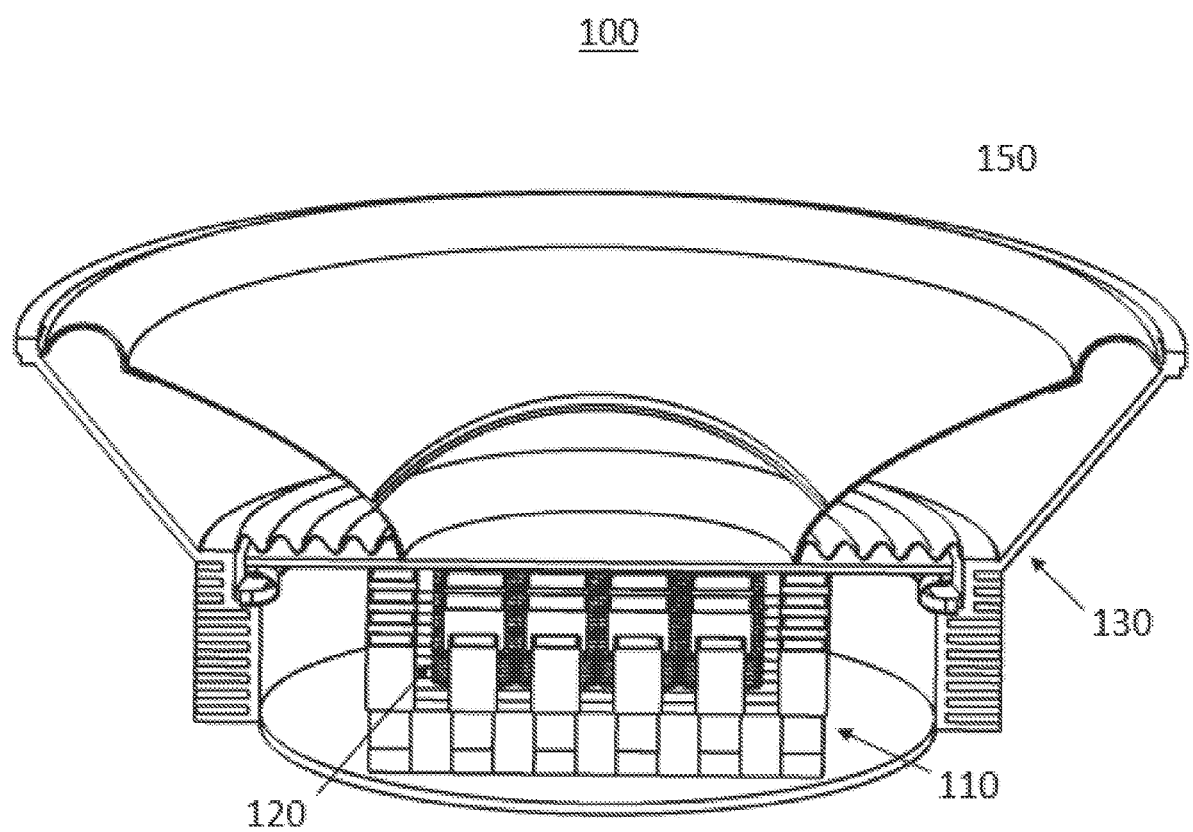
FIG. 1 is a cut-away view of a voice coil array speaker that illustrates the speaker assembly, the magnet assembly, and the coil assembly, according to an example embodiment.

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to a voice coil array speaker apparatus. However, it should be noted that the example embodiments shown and described herein are meant to be illustrative only and not limiting in any way. As such, various modifications will be apparent to those skilled in the art for application of example embodiments based on technologies other than the above, which may be in various stages of development and intended for future replacement of, or use with, the above described method or apparatus.

With respect to example embodiments, there is a need in the art for a voice coil speaker design that uses less permanent magnet material, has lower inductance for increased frequency bandwidth, provides a high magnetic flux density for improved efficiency, and provides passive conductive cooling of the voice coil to prevent overheating and allow operation at higher power levels.

A voice coil speaker design goal may be to minimize the amount of permanent magnet material required to establish the magnetic flux. Permanent magnets may be relatively expensive and commonly used permanent magnet materials, such as neodymium, may be limited in supply. A second voice coil speaker design goal may be to minimize coil inductance because the voltage required to produce a current at a particular frequency is proportional to the inductance at that frequency. The coil inductance is typically the limiting factor that determines the usable frequency bandwidth of the speaker. A third voice coil speaker design goal may be to operate at high efficiency as that reduces the size and power usage of the amplifier used to drive the speaker. Efficiency may be increased when the voice coil resides in a high magnetic flux density. A fourth voice coil speaker design goal may be to provide effective cooling of the voice coil. The resistance of the voice coil wire may produce heat, which affects the fidelity and must be removed to prevent damage to the voice coil and other speaker components.

The amount of permanent magnet material required may depend on the reluctance of the magnetic circuit. Since permanent magnets may have a permeability approximately equal to air, a major part of the magnetic circuit reluctance is due to the magnet thickness itself. A magnetic circuit arrangement that uses two or more thin magnets in combination may require less material than an equivalent circuit with one thick magnet.

Coil inductance may depend upon many factors, including: the number of turns in the coil, the area enclosed, and the reluctance of the path that links the magnetic flux from one coil conductor to the others. Conventional voice coil designs may commonly use fewer turns than desired from a force generation standpoint in order to minimize the inductance and increase the bandwidth. Some devices may use a conducting loop, called a shorting ring or Faraday ring, in the coil flux path. Current induced in this loop counteracts the coil flux, which raises the path reluctance and thereby the inductance.

The current conducting coil of a voice coil speaker is typically wound onto a coil former that is made of a material with a low electrical conductivity such as paper or plastic. These materials may typically have a low thermal conductivity of about 0.2 W/mK and therefore carry away little of the heat energy generated in the coil. Improved heat transfer may be realized by making the coil former from materials with a high thermal conductivity such as aluminum, with conductivity of 240 W/mK, or copper, with conductivity of 400 W/mK. Unfortunately, these materials may have a high electrical conductivity which causes two problems: (1) the current in the coil induces a counter-current in the coil former which interacts with the magnetic field to produce forces that tend to cancel the coil forces; and (2) the motion of the coil former relative to the magnetic field induces eddy currents in the coil former which retard the relative motion and produces heating and audio distortion. Active cooling methods have been developed including forced air flow through the gap or liquid cooling of the coil or magnets. Although these methods are effective, they tend to increase cost and weight while reducing reliability.

Example embodiments provide a voice coil array speaker of the type where a speaker frame supports a diaphragm on the lower edge with a flexible spider and on the top edge by an upper half roll compliance. Thus, the diaphragm may be prevented from radial movement and allowed to move axially by flexible mounts. The diaphragm may be connected to a heat conducting front plate. A coil assembly comprising of an array of coils wound around heat conducting coil formers may be connected to the heat conducting front plate. A magnet assembly may be attached to the base plate, wherein the magnet assembly comprises an array of laterally and vertically polarized permanent magnets in contact with flux concentrators, wherein the flux concentrators correspond to and are aligned with the coils of the coil assembly, such that a concentrated uniform magnetic flux is directed laterally through the coils causing a force to be produced in response to current flow through the coils thereby causing the diaphragm to produce sound. Thermal bridges may be configured to conduct heat from the heat conducting front plate to the speaker frame. The speaker frame may include fins that facilitate transfer of heat to the surrounding air.

In example embodiments, the coil former may be made of a material with high thermal conductivity, such as aluminum or copper, to passively cool the coil by transferring the heat from the coils to the speaker front plate and from there to the speaker frame through thermal bridges. The heat conducting coils former may include axial slits that prevent induction of a counter-current due to coil currents and eddy currents due to relative motion of the voice coil in the magnetic field.

FIG. 1 is a cut-away view 100 of voice coil array speaker 150 according to an example embodiment. As shown, the voice coil array speaker 150 includes a speaker assembly 130, a coil array assembly 120, and a magnet array assembly 110. The coil array assembly 120 may comprise an array of coils wound around heat conducting coil formers connected to a heat conducting front plate. The magnet array assembly 110 may be attached to the base plate. The magnet array assembly 110 may comprise an array of laterally and vertically polarized permanent magnets in contact with flux concentrators. The speaker assembly 130 may comprise at least a diaphragm, thermal bridges, a speaker base, fins, and a dust cap.

Figure 2:
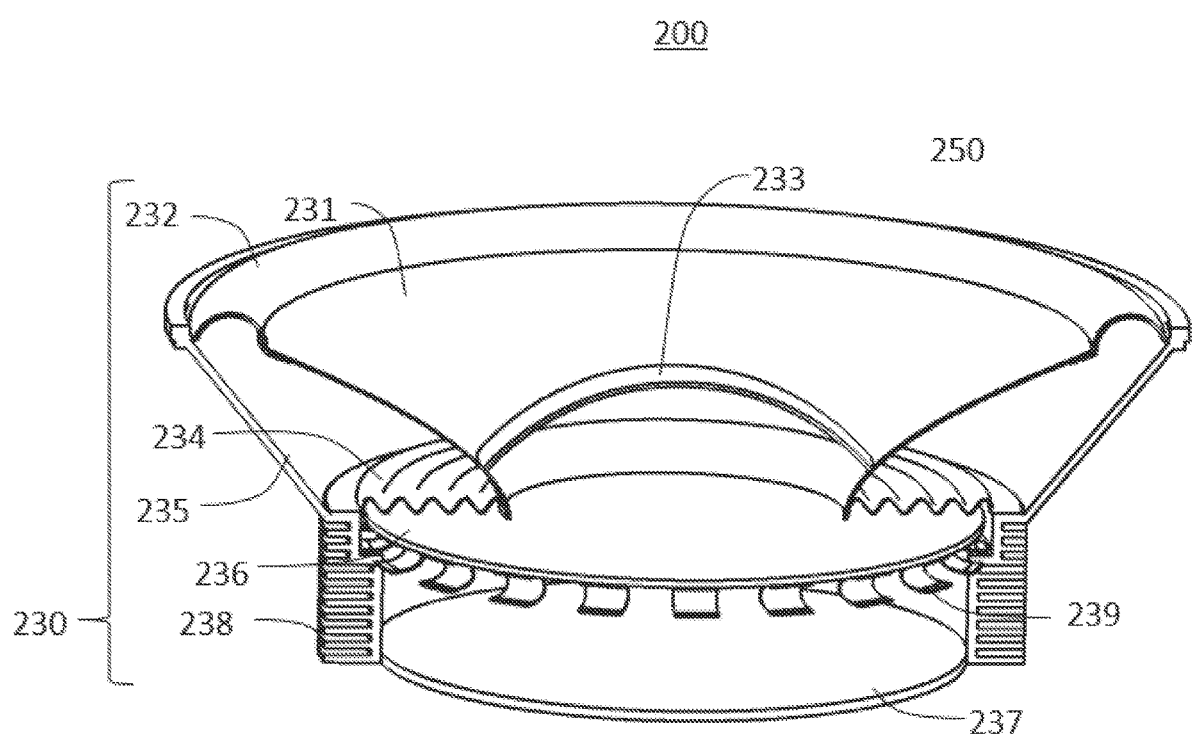
FIG. 2 is a cut-away view of a speaker assembly according to an example embodiment.

FIG. 2 is a cut-away view 200 of speaker assembly 230. Speaker assembly 230 may include speaker frame 235 which supports diaphragm 231 on the lower edge with flexible spider 234 and on the top edge with flexible upper half roll compliance 232. Diaphragm 231 may thereby be prevented from radial movement and allowed to move axially. Heat conducting front plate 236 and dust cap 233 may be also connected to diaphragm 231 and move with it. Thermal bridges 239 may be connected between front plate 236 and speaker frame 235. Speaker frame 235 may be connected to and supported by speaker base plate 237.

Speaker frame 235 and front plate 236 may be preferably made from material with high thermal conductivity such as aluminum. Speaker frame 235 may include fins 238 that facilitate heat transfer to the surrounding air. Thermal bridges 239 may be preferably made from material with high thermal conductivity such as aluminum or copper configured as thin strips or braided wire strands for high flexibility. Thermal bridges 239 may conduct heat from front plate 236 to speaker frame 235 without adding significantly to the overall axial stiffness of voice coil array speaker 250.

Figure 3A:
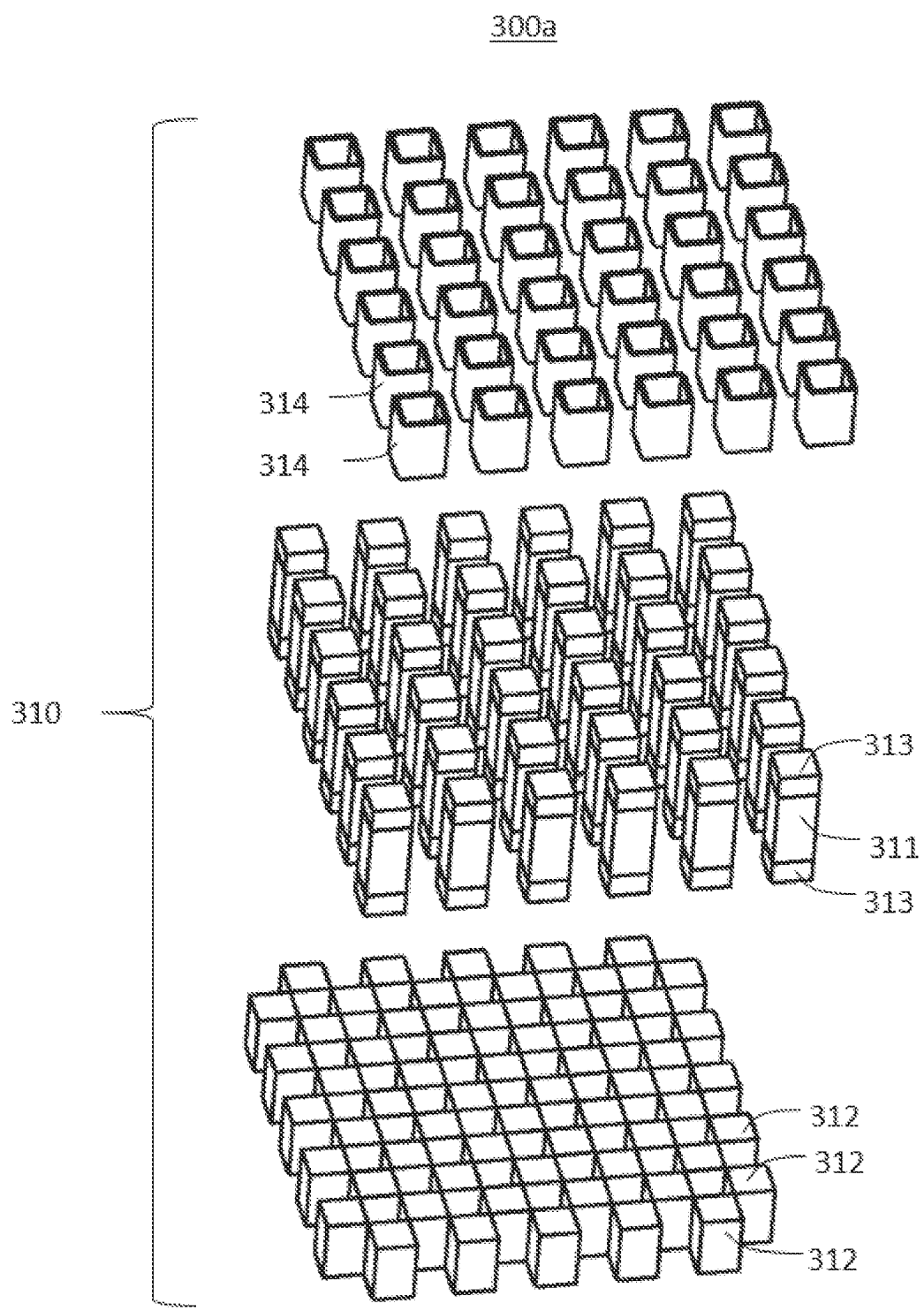
FIG. 3A is a first exploded view of a magnet assembly, alongside a coil assembly, according to an example embodiment.

FIG. 3A is a first exploded view 300a of the magnet assembly 310 according to an example embodiment. Magnet array assembly 310 may comprise of rectangular array of flux concentrators 311, laterally polarized magnets 312, vertically polarized magnets 313, and shorting sleeves 314. Each flux concentrator 311 may have two vertically polarized magnets 313 in contact with one being at the top and the other at the bottom. Each flux concentrator 311 may be surrounded by a shorting sleeve 314, which may also surround the top vertically polarized magnet 313. Laterally polarized magnets 312 may be between and in contact with the flux concentrators 311. Laterally polarized magnets 312 and vertically polarized magnets 313 may be preferably made of high strength magnetic material such as Neodymium Iron Boron (NdFeB). Flux concentrators 311 may be preferably made of silicon steel or magnetic stainless steel to provide high permeability and low hysteresis. Shorting sleeves 314 may be preferably made from electrically conductive material such as copper.

Figure 3B:
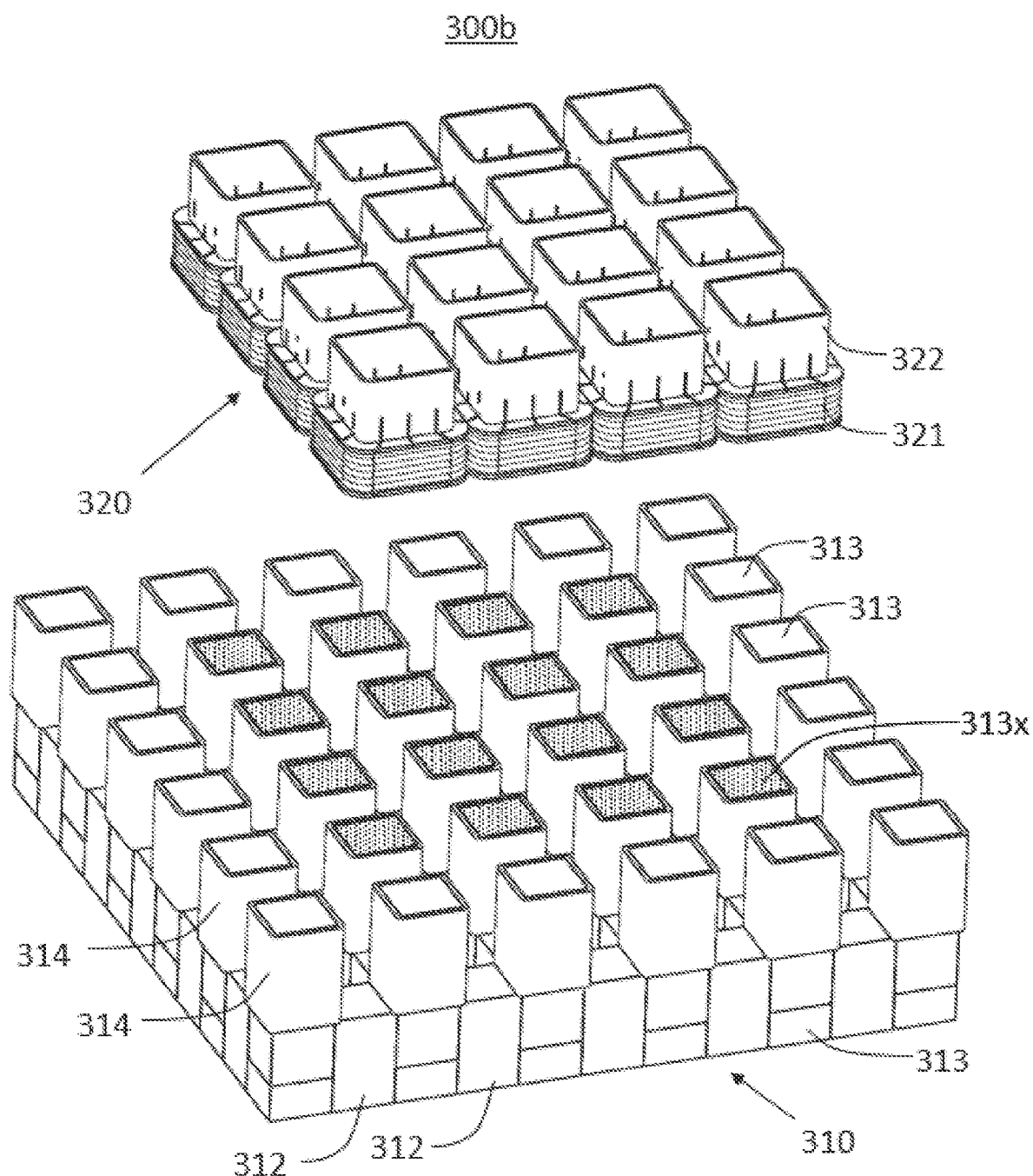
FIG. 3B is a second exploded view of a magnet assembly, according to an example embodiment.

FIG. 3B is a first exploded view 300b of a magnet array assembly 310, alongside a coil array assembly 320, according to an embodiment. Coil array assembly 320 may comprise of a rectangular array of coils 321 wound onto heat conducting coil formers 322. As shown, coil array 320 may be four-by-four, for a total of sixteen (16) coils and coil formers. In alternate example embodiments, coil array 320 may have any convenient dimensionality such as three by five, or four by six. Coil array 320 may be attached to a front plate of a speaker assembly for mechanical support and heat transfer, such as that illustrated in FIG. 2. Coils 321 may be preferably wound from insulated copper wire manufactured for coils, known as magnet wire. Coil formers 322 may be preferably made from material with high thermal conductivity such as aluminum.

The center sixteen (16) flux concentrators 311 of magnet array assembly 310 may form a four-by-four array that corresponds to the four-by-four arrangement of coil array assembly 320. This is depicted by the overlapping top vertically polarized magnets 313x from the top vertically polarized magnets 313. Each coil 321 and coil former of coil array assembly 320 may surround a flux concentrator 311 and shorting sleeve 314 of magnet array assembly 310. Each coil 321 and coil former 322 of coil array assembly 320 may be surrounded by flux concentrators 311 with one flux concentrator 311 being on each side. When the coil array 320 has a different dimensionality than four-by-four then the magnet array assembly 310 is similarly changed such that each coil 321 surrounds a flux concentrator 311 and is also surrounded by flux concentrators 311. The laterally polarized magnets 312 and the vertically polarized magnets 313 may be positioned below the coil array 320.

Figure 4A:
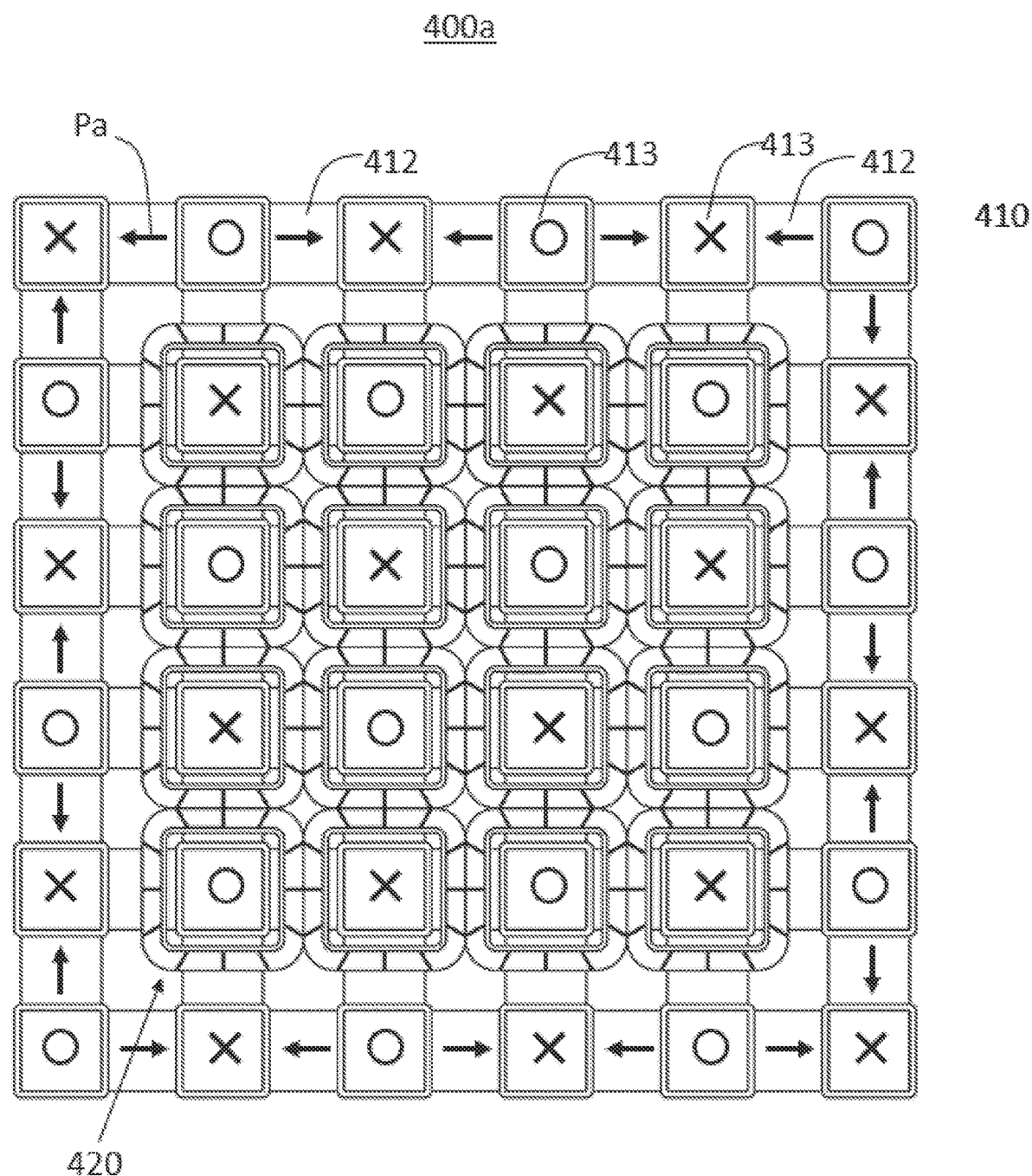
FIG. 4A is a top view of a magnet assembly and coil assembly, illustrating the magnet polarization directions, according to an example embodiment.

FIG. 4A is a top view 400a of a magnet assembly 410 and coil assembly 420, illustrating the magnet polarization directions, according to an example embodiment. The orientation of laterally polarized magnets 412 is shown by arrows Pa for top view 400a. The orientation of vertically polarized magnets 413 is shown by X for into the page and O for out of the page.

Figure 4B:
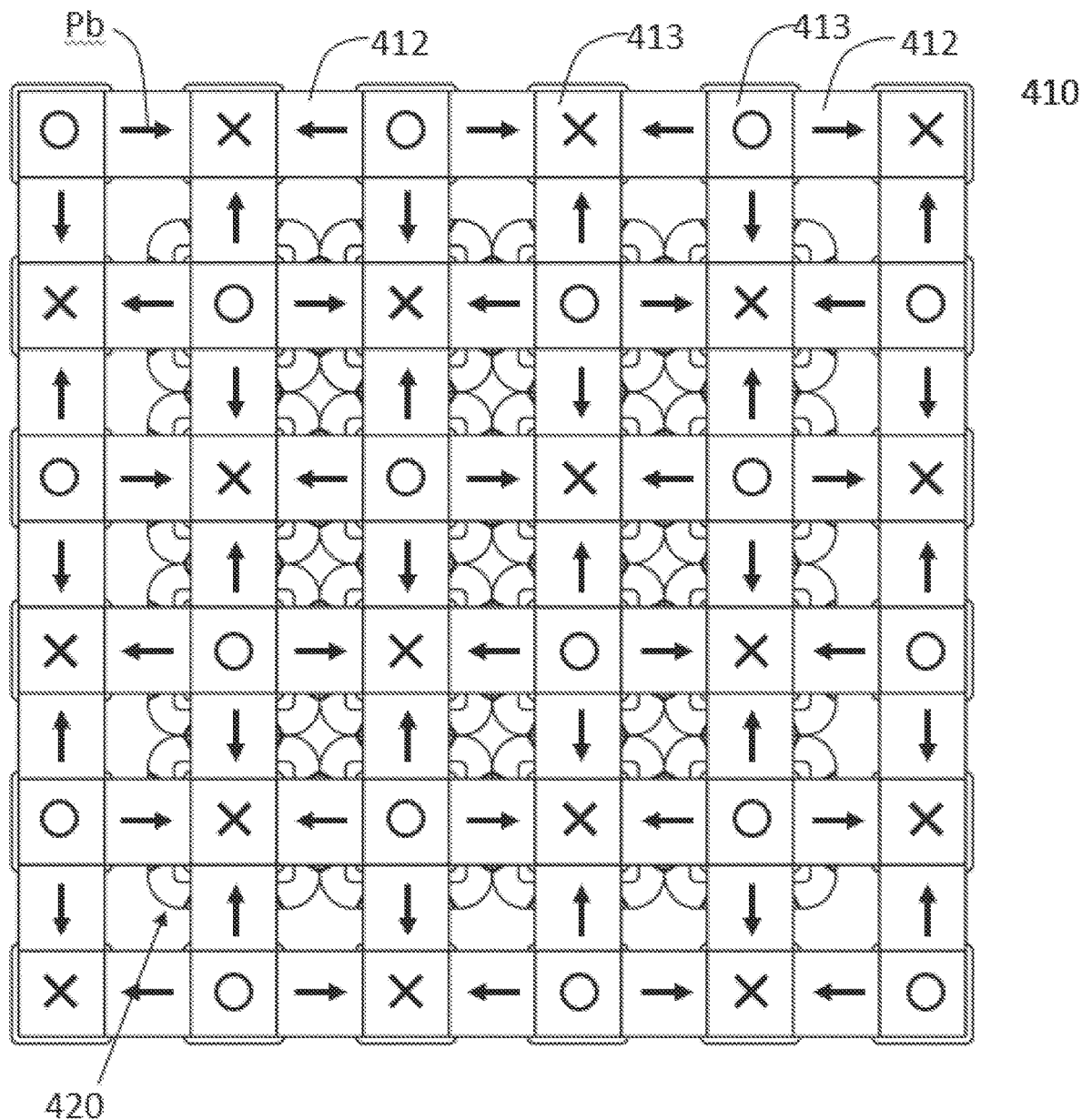
FIG. 4B is a bottom view of a magnet assembly and coil assembly, illustrating the magnet polarization directions, according to an example embodiment.

Similarly, FIG. 4B is a bottom view 400b of a magnet assembly 410 and coil assembly 420, illustrating the magnet polarization directions, according to an example embodiment. The orientation of laterally polarized magnets 412 is shown by arrows Pb for bottom view 400b, which are in an opposite direction from the top view 400a. The orientation of vertically polarized magnets 413 is shown by X for into the page and O for out of the page, which are also in an opposite direction from the top view 400a.

Figure 5A:
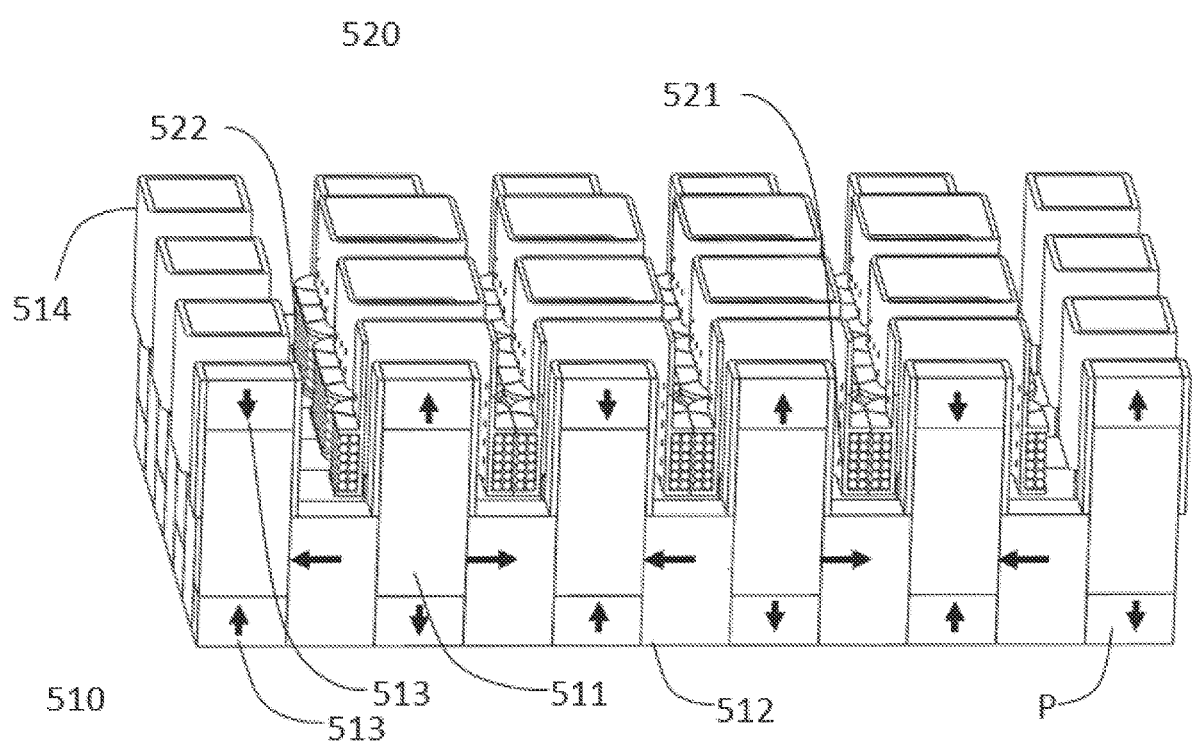
FIG. 5A is a cross-sectional view of a magnet assembly and coil assembly, illustrating the magnet polarization directions, according to an example embodiment.

FIG. 5A is a cross-sectional view 500a illustrating the magnet polarization direction at one location. Illustrated are a magnet array assembly 510 and a coil array assembly 520. In cross-sectional view 500a, the magnet orientation is shown by arrows P for both laterally polarized magnets 512 and vertically polarized magnets 513. Note that the magnet polarization pattern shown, with alternating up and down polarization interspaced with alternating left and right polarization, is commonly known as a Halbach array. Extending upward are the shorting sleeves 514. Also visible are components of the coil assembly, such as coils 521 and coil formers 522.

Figure 5B:
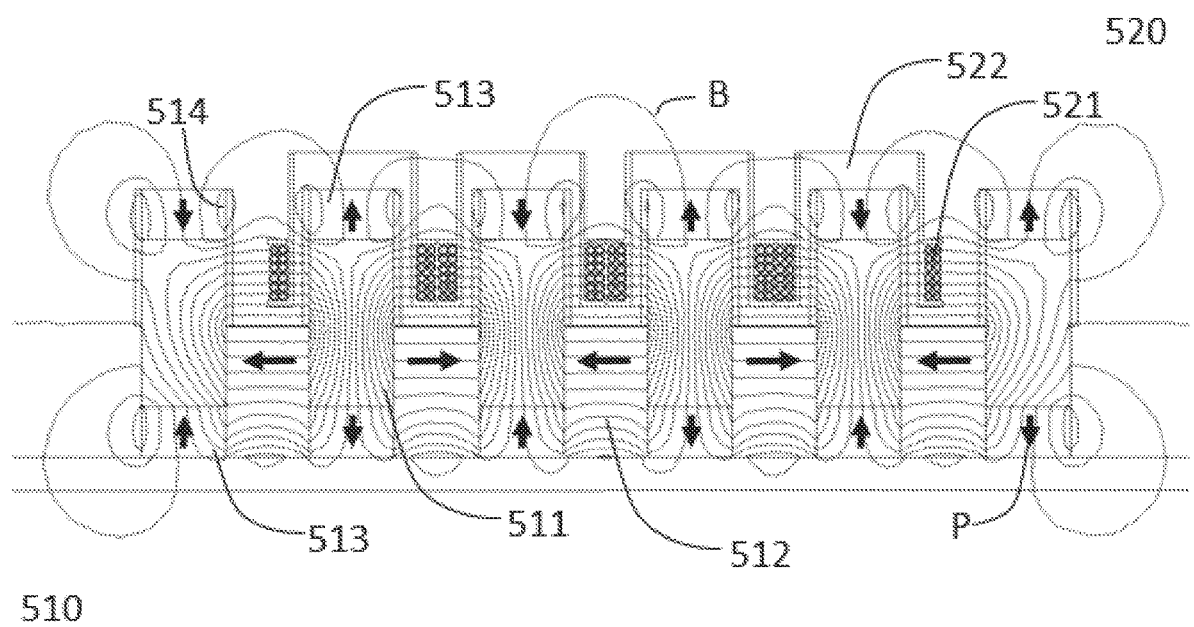
FIG. 5B illustrates a magnetic model of a magnet assembly and coil assembly according to an example embodiment.

FIG. 5B illustrates a planar magnetic model 500b corresponding to the cross-section of FIG. 5A. In FIG. 5B, magnet array assembly 510 and a coil array assembly 520 are again illustrated. The magnet orientation is shown by arrows P and calculated lines of magnetic flux are shown by lines B. Planar magnetic model 500b shows that the polarization pattern, with alternating up and down polarization interspaced with alternating left and right polarization, may produce a high magnetic flux B into the flux concentrators 521 with very little flux B directed outside of the magnet array assembly 520. The magnetic flux B may primarily pass from one flux concentrator 511 to an adjacent flux concentrator 511 through the coils 521, the coil formers 522, and the shorting sleeves 514 in a complete loop. Electrical current through coils 521 may interact with the magnetic field B to produce force in the vertical direction. The direction of magnetic flux between the flux concentrators 511, and therefore through coils 521, may alternate from left to right throughout the magnet array assembly 520. Note that the laterally polarized magnets 512 and vertically polarized magnets 513 may be thin relative to typical voice coil magnets and their magnetic path reluctance is correspondingly low resulting in a high magnetic flux density relative to the total magnet volume. Each magnet may also contributes flux to multiple coils 521 which may further increases the efficiency of magnet usage.

Each shorting ring 514 may form a complete conducting loop around each flux concentrator 511 inside of coils 521. When current flows through coil 521, it may induce current loops in shorting ring 514. This may cancel the magnetic flux from the coil 521 to reduce the flux linkage and inductance of the coil 521. It may also prevents flux from entering flux concentrators 511 and linking with the other coils 521. Thus, the total inductance of all of the coils 521 may be lower than would be exhibited by a single equivalent coil.

Figure 6:
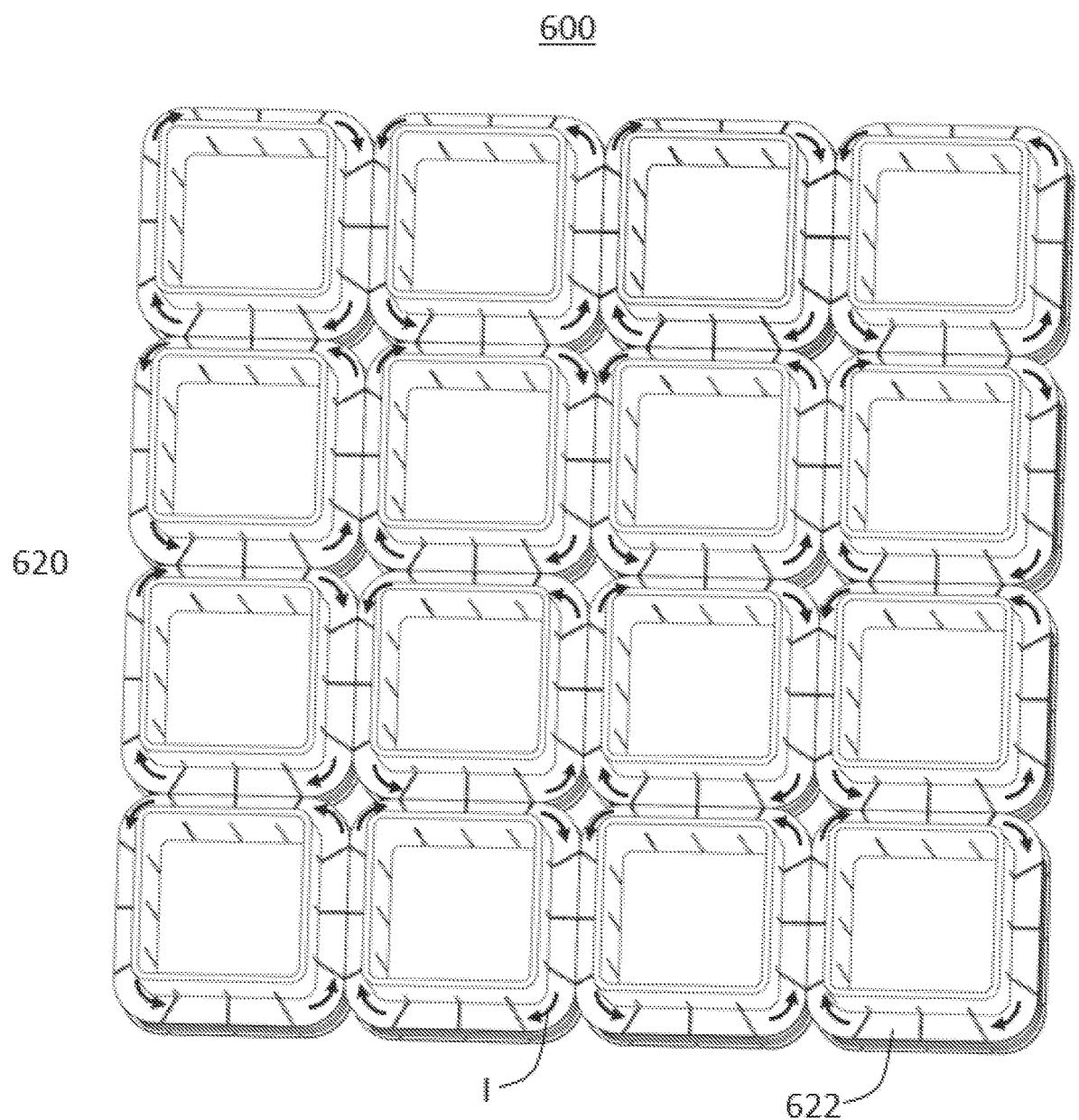
FIG. 6 is a top view of a coil assembly, illustrating the direction of current flow, according to an example embodiment.

FIG. 6 is a top view 600 of coil array assembly 620. Coils may be wrapped around a coil former 622. Arrows I illustrate the relative direction of current flow in each coil, with each clockwise coil being next to counterclockwise coils as shown. Note that moving laterally across the coil array, the current alternates in direction as does the magnetic field through coils. Therefore, all coils may produce force in the same direction. Coils may be connected in series or parallel, as desired, to produce a single circuit with a single current input and output. Reversing the direction of current input may reverse the direction of all arrows shown in FIG. 6, which reverses the direction of force produced.

Figure 7:
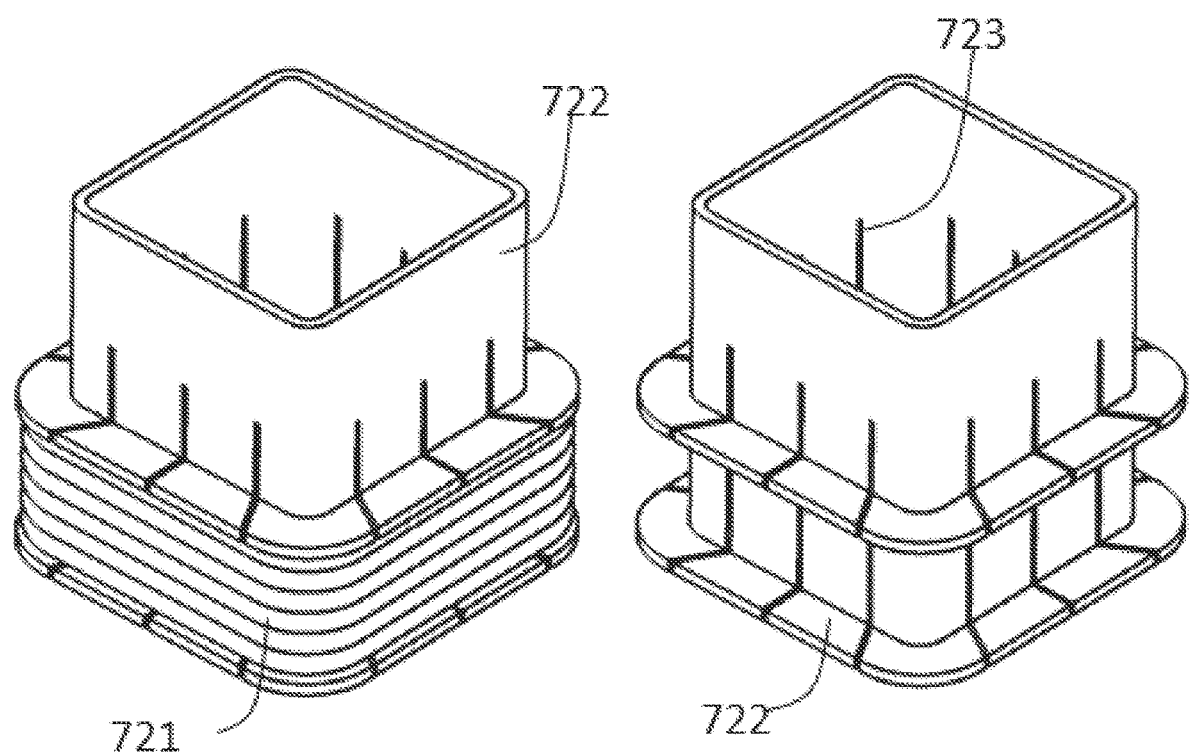
FIG. 7 is an illustration of two heat conducting coil formers and a coil, according to an example embodiment.

FIG. 7 is an illustration 700 of two heat conducting coil former 722 and a coil 721. Coil former 722 may include axial slits 723. This may prevent induction of a counter-current due to coil currents and eddy currents due to relative motion in the magnetic field. The slits may be of any convenient width appropriate to the manufacturing process. Slit cutting is particularly well suited to Electrical Discharge Machining (EDM) which produces a slit width of about 0.1 to 0.3 mm. The optimum number and spacing of the axial slits depend primarily on the frequency range of the speaker. For example, a low frequency speaker that produces up to about 200 Hz may have 8 slits while a higher frequency speaker that produces over 16 kHz may have 36 or more slits.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A voice coil array speaker comprising:
    a speaker assembly, the speaker assembly comprising,
        a speaker frame, a stationary base plate connected to the speaker frame,
a diaphragm connected to the speaker frame and configured to be capable of axial movement, and
a heat conducting front plate connected to the diaphragm, and
thermal bridges configured to conduct heat from the heat conducting front plate to the speaker frame;
a coil assembly connected to the heat conducting front plate, the coil assembly comprising an array of coils wound around coil formers; and
a magnet assembly attached to the stationary base plate, the magnet assembly comprising an array of laterally and vertically polarized magnets in contact with flux concentrators,
wherein the array of coils are connected such that the direction of current flow alternates between clockwise and counterclockwise moving laterally across the array.

2. The voice coil array speaker of claim 1, wherein
the flux concentrators correspond to and are aligned with coils of the arrays of coils, such that a concentrated uniform magnetic flux is directed laterally through the coils, and
a direction of magnetic flux between the flux concentrators and through the coils alternates from left to right moving laterally across the array.

3. The voice coil array speaker of claim 2, wherein the heat conducting front plate is supported by flexible mounts, such that the front plate and attached coil assembly is configured to move axially relative to the speaker frame and base plate.

4. The voice coil array speaker of claim 3, wherein
a force is produced by interaction of the array of coils with a magnetic field when subjected to electrical current flow, the force being the same direction in the array of coils;
the force causes axial movement of the diaphragm; and
the diaphragm causes alternating compression and rarefaction of the contacting air to produce the sound.

5. The voice coil array speaker of claim 3, wherein the array of laterally and vertically polarized magnets are arranged as a Halbach array, with alternating up and down polarization interspaced with alternating left and right polarization, the Halbach array directing the magnetic flux into the flux concentrators and through the coils in the array of coils.

6. The voice coil array speaker of claim 3, the magnet assembly further comprising:
shorting sleeves forming a complete conducting loop around the flux concentrators inside of the coils,
wherein current flowing through the array of coils induces current loops in the shorting sleeves, which cancel the magnetic flux from the coils and reduce flux linkage and inductance of the array of coils.

7. The voice coil array speaker of claim 3, wherein the coil formers are made of material with high thermal conductivity and conduct heat from the array of coils to the heat conducting front plate, where the heat is transferred through the thermal bridges to the speaker frame.

8. The voice coil array speaker of claim 3, wherein the coil formers include axial slits to prevent eddy currents from being induced in the coil former by a current through the voice coil or by relative motion of the coil former with a magnetic field.

9. The voice coil array speaker of claim 3, wherein the speaker frame includes fins to facilitate transfer of heat to surrounding air.

10. The voice coil array speaker of claim 3, wherein the array of coils are connected in series or in parallel.

* * * * *